(12) United States Patent
Guo et al.

(10) Patent No.: US 10,423,495 B1
(45) Date of Patent: Sep. 24, 2019

(54) DEDUPLICATION GROUPING

(71) Applicant: Veritas Technologies LLC, Mountain View, CA (US)

(72) Inventors: Fanglu Guo, Los Angeles, CA (US); Weibao Wu, Vadnais Heights, MN (US); Xianbo Zhang, Plymouth, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 220 days.

(21) Appl. No.: 14/480,507

(22) Filed: Sep. 8, 2014

(51) Int. Cl.
  *G06F 16/00* (2019.01)
  *G06F 11/14* (2006.01)
  *G06F 16/28* (2019.01)

(52) U.S. Cl.
  CPC ........ *G06F 11/1453* (2013.01); *G06F 16/285* (2019.01)

(58) Field of Classification Search
  None
  See application file for complete search history.

(56) References Cited

U.S. PATENT DOCUMENTS

| | | | |
|---|---|---|---|
| 5,561,421 A | 10/1996 | Smith et al. | |
| 5,990,810 A | 11/1999 | Williams | |
| 6,014,676 A | 1/2000 | McClain | |
| 6,141,784 A | 10/2000 | Davis et al. | |
| 6,389,433 B1 | 5/2002 | Bolosky et al. | |
| 6,513,051 B1 | 1/2003 | Bolosky et al. | |
| 6,848,078 B1 * | 1/2005 | Birsan | G06F 17/30994 |
| | | | 707/999.202 |
| 6,865,655 B1 | 3/2005 | Andersen | |
| 6,892,250 B2 | 5/2005 | Hoskins | |
| 6,920,537 B2 | 7/2005 | Ofek et al. | |
| 6,983,365 B1 | 1/2006 | Douceur et al. | |
| 6,985,926 B1 | 1/2006 | Ferlauto et al. | |
| 7,047,212 B1 | 5/2006 | Pych et al. | |
| 7,055,008 B2 | 5/2006 | Niles et al. | |
| 7,136,976 B2 | 11/2006 | Saika | |
| 7,146,429 B2 | 12/2006 | Michel | |
| 7,152,060 B2 | 12/2006 | Borthwick et al. | |

(Continued)

FOREIGN PATENT DOCUMENTS

CN    103559224 A    *  2/2014    ....... G06F 17/30097

OTHER PUBLICATIONS

Xie et al., Estimating Duplication by Content-based Sampling, Proceeding, USENIX ATC'13 Proceedings of the 2013 USENIX conference on Annual Technical Conference, 2013.

(Continued)

*Primary Examiner* — Apu M Mofiz
*Assistant Examiner* — Farhad Agharahimi
(74) *Attorney, Agent, or Firm* — Meyertons Hood Kivlin Kowert and Goetzel PC; Rory D. Rankin

(57) ABSTRACT

A method for grouping backup images in deduplication groups is described. In one embodiment, the method includes identifying a new backup image, obtaining metadata from one or more nodes in the new backup image, and comparing the metadata from the one or more nodes in the new backup image with information from one or more nodes in a backup image from a first deduplication group. Each of the one or more nodes include at least in part a file or a directory. The first deduplication group is one group from a plurality of deduplication groups.

15 Claims, 6 Drawing Sheets

(56) References Cited

U.S. PATENT DOCUMENTS

| | | | |
|---|---|---|---|
| 7,200,604 | B2 | 4/2007 | Forman et al. |
| 7,213,158 | B2 | 5/2007 | Bantz et al. |
| 7,257,104 | B2 | 8/2007 | Shitama |
| 7,257,643 | B2 | 8/2007 | Mathew et al. |
| 7,287,019 | B2 | 10/2007 | Kapoor et al. |
| 7,310,644 | B2 | 12/2007 | Adya et al. |
| 7,318,072 | B2 | 1/2008 | Margolus et al. |
| 7,359,920 | B1 | 4/2008 | Rybicki et al. |
| 7,389,394 | B1 | 6/2008 | Karr et al. |
| 7,401,194 | B2 | 7/2008 | Jewell |
| 7,409,523 | B2 | 8/2008 | Pudipeddi et al. |
| 7,424,514 | B2 | 9/2008 | Noble et al. |
| 7,440,965 | B1* | 10/2008 | Pruthi ............... G06F 11/1448 |
| 7,454,592 | B1 | 11/2008 | Shah et al. |
| 7,478,113 | B1 | 1/2009 | De Spiegeleer et al. |
| 7,546,319 | B1 | 6/2009 | Srinivasan et al. |
| 7,567,188 | B1 | 7/2009 | Anglin et al. |
| 7,584,338 | B1 | 9/2009 | Bricker et al. |
| 7,644,136 | B2 | 1/2010 | Rose et al. |
| 7,685,459 | B1 | 3/2010 | De Spiegeleer et al. |
| 7,689,764 | B1 | 3/2010 | De Spiegeleer et al. |
| 7,725,704 | B1 | 5/2010 | Beaverson et al. |
| 7,814,149 | B1 | 10/2010 | Stringham |
| 7,818,495 | B2 | 10/2010 | Tanaka et al. |
| 7,818,535 | B1 | 10/2010 | Bono et al. |
| 7,870,105 | B2 | 1/2011 | Arakawa et al. |
| 8,136,025 | B1 | 3/2012 | Zhu et al. |
| 8,166,012 | B2 | 4/2012 | Reddy et al. |
| 8,311,964 | B1 | 11/2012 | Efstathopoulos et al. |
| 8,762,338 | B2 | 6/2014 | Christiaens et al. |
| 2001/0045962 | A1 | 11/2001 | Lee et al. |
| 2002/0107877 | A1 | 8/2002 | Whiting et al. |
| 2004/0044707 | A1 | 3/2004 | Richard |
| 2004/0143731 | A1 | 7/2004 | Audebert et al. |
| 2005/0027766 | A1 | 2/2005 | Ben et al. |
| 2005/0149583 | A1* | 7/2005 | Baskaran .......... G06F 17/30309 |
| 2005/0198328 | A1 | 9/2005 | Lee et al. |
| 2005/0204108 | A1 | 9/2005 | Ofek et al. |
| 2005/0216813 | A1 | 9/2005 | Cutts et al. |
| 2005/0240628 | A1 | 10/2005 | Jiang et al. |
| 2006/0026219 | A1 | 2/2006 | Orenstein et al. |
| 2007/0067332 | A1 | 3/2007 | Gallagher et al. |
| 2007/0198609 | A1* | 8/2007 | Black ................... G06Q 10/087 |
| 2007/0198659 | A1 | 8/2007 | Lam |
| 2007/0250674 | A1 | 10/2007 | Fineberg et al. |
| 2007/0288494 | A1 | 12/2007 | Chrin et al. |
| 2008/0005141 | A1 | 1/2008 | Zheng et al. |
| 2008/0077572 | A1* | 3/2008 | Boyle ................. G06F 17/2705 |
| 2008/0133561 | A1 | 6/2008 | Dubnicki et al. |
| 2008/0154989 | A1 | 6/2008 | Arman |
| 2008/0205774 | A1* | 8/2008 | Brinker ............. G06F 17/30707 382/225 |
| 2008/0243769 | A1 | 10/2008 | Arbour et al. |
| 2008/0243878 | A1 | 10/2008 | De Spiegeleer et al. |
| 2008/0243953 | A1 | 10/2008 | Wu et al. |
| 2008/0244204 | A1 | 10/2008 | Cremelie et al. |
| 2009/0132616 | A1 | 5/2009 | Winter et al. |
| 2009/0171888 | A1 | 7/2009 | Anglin |
| 2009/0177855 | A1 | 7/2009 | Drews et al. |
| 2009/0204636 | A1 | 8/2009 | Li et al. |
| 2009/0204650 | A1 | 8/2009 | Wong et al. |
| 2009/0319534 | A1 | 12/2009 | Gokhale |
| 2010/0082700 | A1 | 4/2010 | Parab |
| 2010/0131480 | A1 | 5/2010 | Schneider |
| 2010/0250896 | A1* | 9/2010 | Matze ................ G06F 3/0608 711/216 |
| 2010/0257403 | A1 | 10/2010 | Virk et al. |
| 2010/0274982 | A1 | 10/2010 | Mehr et al. |
| 2010/0281077 | A1 | 11/2010 | Lillibridge et al. |
| 2010/0306175 | A1 | 12/2010 | Johnson et al. |
| 2011/0099200 | A1 | 4/2011 | Blount et al. |
| 2011/0099351 | A1* | 4/2011 | Condict ............... G06F 3/0608 711/216 |
| 2011/0125716 | A1 | 5/2011 | Drews et al. |
| 2011/0213911 | A1* | 9/2011 | Eidus .................. G06F 9/4856 711/6 |
| 2011/0258404 | A1* | 10/2011 | Arakawa ............. G06F 3/0608 711/162 |
| 2015/0096023 | A1* | 4/2015 | Mesdaq ............... H04L 63/145 726/23 |

OTHER PUBLICATIONS

Lillibridge et al., Sparse Indexing: Large Scale, Inline Deduplication Using Sampling and Locality, Fast '09 Proceedings of the 7th conference on File and storage technologies, 2009.

Bhagwat et al., Extreme Binning: Scalable, Parallel Deduplication for Chunk-based File Backup, IEEE International Symposium on Modeling, Analysis & Simulation of Computer and Telecommunication Systems, 2009.

"Locality-sensitive hashing", Wikipedia.org, May 2016, 7 pages, https://en.wikipedia.org/wiki/Locality-sensitive_hashing. [Retrieved May 11, 2016].

Bromley et al., U.S. Appl. No. 11/641,389, entitled "Single Instance Storage", filed Dec. 18, 2006, 30 pages.

"Symantec NetBackup PureDisk™ Getting Started Guide", 2009, 111 pages, Release 6.6, revision 2, Symantec Corporation, http://www.symantec.com/business/support/resources/sites/BUSINESS/content/live/TECHNICALSOLUTION/75000/TECH75147/en_US/334167.pdf. [Retrieved Jun. 20, 2011].

"Next-generation backup and recovery with global, source data de-duplication", EMC Avamar Data Sheet, 2008, 4 pages, http://www.openstore.com/pdfs/products/EMC/h2568_emc_avamar_ds_ldv.pdf. [Retrieved Aug. 11, 2016].

"Schedule a Data Verification Operation", Oct. 27, 2007, 1 page, http://web.archive.org/web/20071027154929/http://documentation.commvault.com/commvault/release_7_0_0/books_online_1/english_us/features/data_verification/how_to/storpol_sched_verify_data.htm. [Retrieved Jun. 21, 2011].

"Data Invulnerability Architecture: The Ultimate in Data Integrity and Recoverability", Data Domain, 2009, 1 page, http://www.datadomain.com/products/DIA.html. [Retrieved Jun. 5, 2011].

"Press Release: Data Domain Delivers Breakthrough Protection and Simplicity in a Cost-Effective, Disk-Based Recovery Appliance", Data Domain, Jun. 9, 2003, 4 pages, http://www.datadomain.com/news/press_rel_060903.html. [Retrieved Jun. 20, 2011].

Zhu, et al., "Avoiding the Disk Bottleneck in the Data Domain Deduplication File System", FAST'08 Proceedings of the 6th USENIX Conference on File and Storage Technologies, Feb. 26, 2008, pp. 269-282, USENIX Association Berkeley, CA, USA.

Search Report in United Kingdom application No. GB0805503.0, dated Jul. 24, 2008, 1 page.

"Veritas NetBackup PureDisk™ Remote Office Edition Administrator's Guide", 2006, 262 pages, Release 6.0, MP1, Revision 6.0.4, Symantec Corporation.

"NetBackup 6.0 PureDisk Remote Office Edition", Apr. 5, 2006, 2 pages, http://web.archive.org/web/20081117092813/http://www.distrilogie.be/BE/news/news.aspx?id=236. [Retrieved Aug. 6, 2009].

De Wispelaere, Wim, "Secure Optimized Data Protection for Remote Offices: An Overview of Veritas NetBackup PureDisk™ Remote Office Edition", Mar. 7, 2006, 20 pages, Symantec Corporation.

"A Data Cleansing Software Suite for Business and IT users", Data Ladder—Get the most out of your data, 2014, www.dataladder.com, 1 page. [Retrieved Nov. 12, 2014].

"Midrange & Mainframe Systems", Data Domain, May 25, 2010, http://web.archive.org/web/20100525234619/http://www.datadomain.com/solutions/mainframe.html, 1 page. [Retrieved Apr. 24, 2015].

"An EMC Perspective on Data De-Duplication for Backup", EMC Perspective, Jun. 2008, 11 pages, http://web.archive.org/web/20090320022757/http://www.emc.com/collateral/emc-perspective/h4413-data-dedup.pdf. [Retrieved Apr. 24, 2015].

"Dedupe media going offline", Symantec Corporation, Jan. 12, 2010, 3 pages, http://aka-community.symantec.com/connect/pt-br/forums/dedupe-media-going-offline. [Retrieved Apr. 24, 2015].

Gralla, Preston, "Audio Dedupe Cleans up Your Music Collection", PCWorld, Feb. 27, 2010, 4 pages, http://web.archive.org/web/

(56) References Cited

OTHER PUBLICATIONS

20110114085518/http://www.pcworld.com/article/188401/audio_dedupe_cleans_up_your_music_collection.html?tk=mod_rel. [Retrieved Apr. 24, 2015].
Cremelie, Nick, U.S. Appl. No. 12/899,339, entitled "System and Method for Efficient Data Removal in a Deduplicated Storage System", filed Oct. 6, 2010, 31 pages.

* cited by examiner

DEDUPLICATION GROUPING

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the widespread use of computers and mobile devices has come an increased presence of and continued advancements in data storage and cloud storage systems. A storage application may run in the background to store data on a device in an online storage system.

SUMMARY

According to at least one embodiment, a method for grouping backup images in deduplication groups is described. In one embodiment, the method may include identifying a new backup image, obtaining metadata from one or more nodes in the new backup image, and comparing the metadata from the one or more nodes in the new backup image with information from one or more nodes in a backup image from a first deduplication group. Each of the one or more nodes may include at least in part a file or a directory. The first deduplication group may be one group from a plurality of deduplication groups.

In some embodiments, the method may include determining, according to a predetermined matching threshold, whether the new backup image matches the first deduplication group based on the comparing the metadata from the one or more nodes in the new backup image with information from one or more nodes in the backup image from the first deduplication group. Upon detecting a match, the new backup image may be placed in the matching group. Upon failing to match the new backup image with one of the plurality of deduplication groups, the method may include creating a new deduplication group and storing the new backup image in the new deduplication group. In some cases, the method may include encoding metadata from the one or more nodes in a backup image from the first deduplication group with locality-sensitive hashing. Locality-sensitive hashing may be used to determine whether a match exists between the new backup image and one of the plurality of deduplication groups based on metadata from the backup images in the plurality of deduplication groups.

In one embodiment, the method may include identifying a hierarchical file structure of a file system in the new backup image and comparing the hierarchical file structure of the file system in the new backup image to a hierarchical file structure of a file system in the backup image from the first deduplication group. In some cases, the method may include obtaining metadata from a data structure of a database management system in the backup image and comparing the metadata from the data structure of the database management system in the backup image with information from a data structure in the backup image from the first deduplication group. In some embodiments, the method may include obtaining a portion of content within a file of the new backup image, the portion comprising N bits of the content and comparing the portion of content within the file with information from one or more nodes in the backup image from the first deduplication group.

A computing device configured for grouping backup images in deduplication groups is also described. The computing device may include a processor and memory in electronic communication with the processor. The memory may store computer executable instructions that when executed by the processor cause the processor to perform the steps of identifying a new backup image, obtaining metadata from one or more nodes in the new backup image, and comparing the metadata from the one or more nodes in the new backup image with information from one or more nodes in a backup image from a first deduplication group. Each of the one or more nodes may include at least in part a file or a directory. The first deduplication group may be one group from a plurality of deduplication groups.

A non-transitory computer-readable storage medium storing computer executable instructions is also described. When the instructions are executed by a processor, the execution of the instructions may cause the processor to perform the steps of identifying a new backup image, obtaining metadata from one or more nodes in the new backup image, and comparing the metadata from the one or more nodes in the new backup image with information from one or more nodes in a backup image from a first deduplication group. Each of the one or more nodes may include at least in part a file or a directory. The first deduplication group may be one group from a plurality of deduplication groups.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
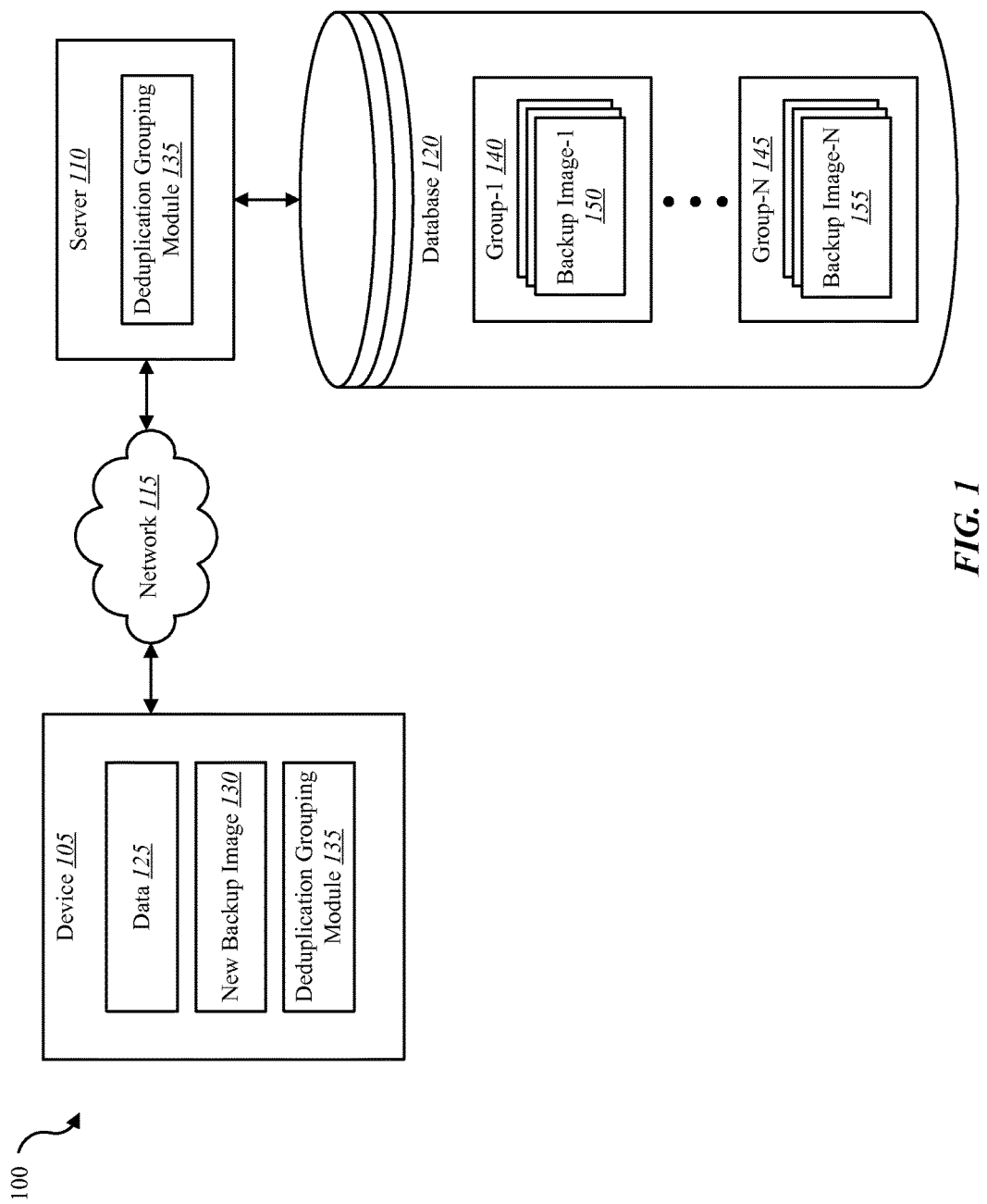
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to deduplication systems. More specifically, the systems and methods described herein relate to grouping backup images in deduplication groups. The systems and methods described herein relate to deduplication systems. More specifically, the systems and methods described herein relate to deduplication grouping in relation to a data storage and recovery system. In one embodiment, the method may include receiving a request to restore a backup image. The backup image may be stored in a deduplication system. The backup image may be stored in one of multiple deduplication groups based on information associated with the backup image. In one embodiment, backup images may be divided into multiple deduplication groups. Backup images that contain similar data may be grouped into the same group. In some cases, data may be clustered to different deduplication groups by comparing file metadata similarity.

Metadata is data that describes other data. Metadata summarizes basic information about data, which can make finding and working with particular instances of data easier. For example, author, date created and date modified and file size are examples of document metadata. In addition to document files, metadata is used for images, videos, spreadsheets and web pages. Metadata for web pages may contain descriptions of the page's contents, as well as keywords linked to the content. These are usually expressed in the form of metatags. The metadata containing the web page's description and summary is often displayed in search results by search engines, making its accuracy and details very important since it can determine whether a user decides to visit the site or not. Metadata may be created manually, or by automated information processing. Metadata may be expressed in plain text, HyperText Markup Language (HTML), Extensible Markup Language (XML), Resource Description Framework (RDF), etc.

Examples of document metadata may include description metadata such as title, subject, tags, categories, and comments. Document metadata may include origin metadata such as authors, last saved by, revision number, version number, program name, company, manager, date and time content created, date and time file last saved, and total editing time. Document metadata may include content metadata such as content status, content type, pages, word count, character count, line count, paragraph count, template, scale, links dirty, and language. Additionally, or alternatively, document metadata may include file metadata such as file size, date created, date modified, date accessed, offline availability, offline status, shared with, device information (device used to create, modify, use file, etc.). A linking file may include metadata such as file name, file type, folder path, size, date created, date modified, attributes, owner, computer/device info, etc.

Examples of image metadata may include global positioning system (GPS) metadata such as GPS version ID, GPS latitude reference, GPS latitude, GPS longitude reference, GPS longitude, GPS time stamp, and GPS date stamp. Additionally, or alternatively, image metadata may include equipment make, equipment model, owner, copyright, date time, document name, host computer, image description, software version, exposure information, color encoding, image resolution, color space, compression information, exposure time, f number, metering mode, orientation, focal length, white balance, etc.

Data deduplication grouping may improve the processing times and computing costs when deduplicating relatively large amounts of data. Each deduplication group may use its own set of deduplication fingerprinting. Thus, the deduplication system may use a first set of fingerprints (e.g., unique identifiers) to identify each file and each file segment that is backed up to a first group, and may use a second set of fingerprints to identify each file and each file segment that is backed up to a second group. Thus, a first deduplication group in a deduplication system may not share its unique identifiers with a second deduplication group in the same deduplication system. Accordingly, in some embodiments, there is no sharing of information among different deduplication groups. However, data and information may be shared within a deduplication group, allowing data within a deduplication group to be deduplicated with respect to the data in that single deduplication group. Deduplication grouping may be used to reduce the degree of data sharing, enabling scalable fixes to reference problems. Fixing a reference problem in a single deduplication group affects only that deduplication group. Without deduplication grouping, however, the entire deduplication system may go offline in order to fix a relatively minor reference problem. Thus, with deduplication grouping, only the deduplication group affected by a reference problem may go offline to fix the problem, enabling the other deduplication groups to remain online and available as the reference problem is fixed. Accordingly, deduplication grouping improves system reliability. Nevertheless, deduplication grouping may increase the likelihood of duplicated data going undetected, as one group may contain exact copies of data in another group. For example, group A and group B may each contain a copy of the same file, but because there is not sharing/deduplication between groups, both copies of the identical file remain on the deduplication system, resulting in an inefficient use of resources. Accordingly, grouping similar data in the same group may decrease the likelihood that the same file exists in two or more deduplication groups.

When a new backup image is to be stored, the present systems and methods may search for a deduplication group that matches the new backup image based on information associated with one or more files and/or directories in the backup image. The present systems and methods include enumerating the top N level of directories and files in a backup image, obtaining file path information, as well as file and directory metadata. Information may be gathered regarding the first N files under a directory, as well as metadata from one or more files and/or directories in the backup image. In some cases, a portion of the files contents may be obtained such as the first N1 bytes, the last N2 bytes, and/or the middle N3 bytes, etc. This metadata and/or content data may be compared with similar information from files and/or directories of backup images already in an existing deduplication group. In some cases, each deduplication group may encode the file metadata information with locality-sensitive hashing. The deduplication group that matches most (e.g., satisfying a matching threshold) to the file metadata in the backup image may be designated as the deduplication group for the new backup image. In some cases, a match may be determined based on satisfying a matching threshold. In some cases, when no match is found, the systems and methods may create a new deduplication group and place the backup image in this new group. Thus, file metadata may be used to estimate file content similarity without the overhead of going through the bulk of the content. Accordingly, file metadata may be used to estimate the probability of files having duplicate data. Advantages to using file metadata to group data may include decreasing processing overhead and reducing system latency, all while maintaining efficient rates of deduplication.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, database 120, and a network 115 that allows the device 105, database 120, and the server 110 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115.

In some configurations, the device 105 may include data 125, a new backup image 130, and deduplication grouping module 135. Although the components of the device 105 are depicted as being internal to the device 105, it is understood that one or more of the components may be external to device 105 and connect to device 105 through wired and/or wireless connections.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a deduplication grouping module 135. In some embodiments, device 105 and server 110 may include a deduplication grouping module 135 where at least a portion of the functions of deduplication grouping module 135 are performed separately and/or concurrently on device 105 and/or server 110. In some cases, network 115 may include deduplication grouping module 135 where at least a portion of the functions of deduplication grouping module 135 are performed separately and/or concurrently on a network device of network 115, device 105, and/or server 110.

In some embodiments, server 110 may be coupled to database 120. Database 120 may be internal or external to the server 110. In one example, device 105 may be coupled directly to database 120, database 120 being internal or external to device 105. Database 120 may include one or more deduplication groups (e.g., group-1 140 to group-N 145). In one example, deduplication grouping module 135 may access group-1 140 in database 120 over network 115 via server 110. Group-1 140 may store one or more backup images (e.g., backup image-1 150, etc.). Likewise, group-N 145 may store one or more backup images (e.g., backup image-N 155, etc.). Database 120 may store backup images from device 105 and/or one or more other computer devices. In one example, deduplication grouping module 135 may generate new backup image 130 from data stored on device 105 (e.g., data 125). In some cases, new backup image 130 may be generated at server 110. For example, server 110 may access data 125 on device 105 and/or data 125 may be communicated to server 110, enabling server 110 to generate the new backup image 130 in conjunction with deduplication grouping module 135.

Deduplication grouping module 135 may enable efficient deduplication grouping. In some embodiments, deduplication grouping module 135 may be configured to perform the systems and methods described herein in conjunction with data 125 and new backup image 130. Data 125 may include one or more files and/or directories. In some cases, data 125 may include a database. In some embodiments, new backup image 130 may include an image of data 125. The new backup image 130 may span one or more computer files. New backup image 130 may include a backup of computer files containing the contents and structure of a disk volume or an entire data storage device, such as a hard drive, tape drive, floppy disk, a read-only memory chip, optical disc or USB flash drive. The new backup image 130 may include a sector-by-sector copy of a source medium. The new backup image 130 may replicate the structure and contents of a storage device independent of the file system. The new backup image 130 may include a system image such as an exact copy of a drive. The new backup image 130 may include an image of one or more drives and include all the system settings, programs, and files needed for an operating system to function. Thus, deduplication grouping module 135 may generate a backup image (e.g., new backup image 130) from data 125 and store the new backup image 130 in a deduplication group in database 120 based on information associated with the new backup image 130. Thus, deduplication grouping module 135 improves the grouping of backup images in deduplication groups by identifying matching information between the new backup image and backup images already contained in a deduplication group. Further details regarding the deduplication grouping module 135 are discussed below.

Figure 2:
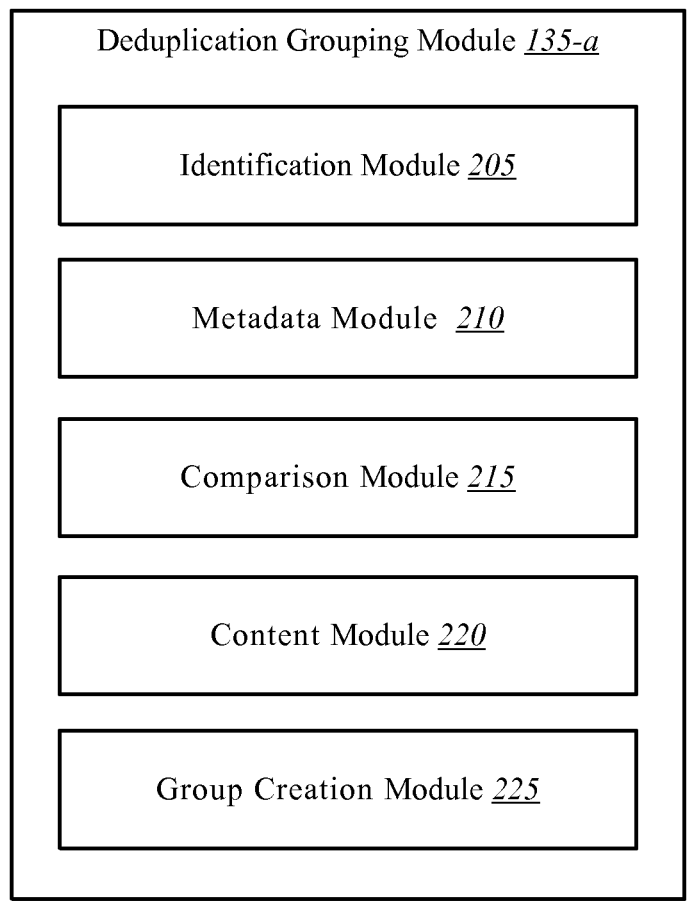
FIG. 2 is a block diagram illustrating one example of a deduplication grouping module.

FIG. 2 is a block diagram illustrating one example of a deduplication module 135-*a*. Deduplication module 135-*a* may be one example of deduplication module 135 depicted in FIG. 1. As depicted, deduplication module 135-*a* may include an identification module 205, metadata module 210, comparison module 215, content module 220, and group creation module 225.

In one embodiment, identification module 205 may identify a new backup image. The new backup image may be communicated between a device with a processor and a deduplication system. For example, the new backup image may be sent from a computing device to a server in a deduplication system. In some cases, one or more files may be sent from the device to the server and the server may generate the new backup image from the files that are sent. A user may select one or more files for the backup image. In some cases the user may select one or more folders and the backup image may be generated from all the content of each selected folder. Thus, the backup image may be an image of one or more files and/or directories. In some cases, the data in the backup image may include a database. The new backup image may span one or more computer files. The new backup image may include a backup of computer files containing the contents and structure of a disk volume or an entire data storage device, such as a hard drive, tape drive, floppy disk, a read-only memory chip, optical disc or USB flash drive. The new backup image may include a sector-by-sector copy of a source medium. The new backup image may replicate the structure and contents of a storage device independent of the file system. The new backup image may include a system image such as an exact copy of a drive. The backup image may include an image of one or more drives and include all the system settings, programs, and files needed for an operating system to function.

In some embodiments, metadata module 210 may obtain metadata from one or more nodes in the new backup image. Each of the one or more nodes may include a file or a directory. Thus, metadata module 210 may obtain metadata for a directory of a file system. Additionally, or alternatively, metadata module 210 may obtain metadata obtain metadata for a file. As explained above, backup images may be stored in a deduplication system. The deduplication system may classify each backup image and store each classified backup image in two or more deduplication groups. Each backup image may be classified based on information associated with the backup image and/or information associated with one or more files and/or directories in the backup image. Accordingly, comparison module 215 may compare the metadata from the one or more nodes in the new backup image with information from one or more nodes in a backup image from a first deduplication group. The first deduplication group may be one group of multiple deduplication groups. Each deduplication group may include one or more unique backup images. The backup images classified with a first classification may be stored in a first deduplication group, backup images classified with a second classification may be stored in a second deduplication group, and so forth. Thus, comparison module 215 may compare the metadata from a file in the new backup image with metadata from a file of a backup image in a first deduplication group. Likewise, comparison module 215 may compare the metadata from the file in the new backup image with metadata from a file of a backup image in a second deduplication group. Based on the comparing the metadata from the one or more nodes in the new backup image with information from one or more nodes in the backup image from the first and second deduplication groups, comparison module 215 may determine, according to a predetermined matching threshold, whether the new backup image matches the first or second deduplication group. Upon determining a match exists, comparison module 215 may assign the new backup image to the matching deduplication group.

In one embodiment, identification module 205 may identify a hierarchical file structure of a file system in the new backup image. For example, identification module 205 may identify each node, directory, folder, root, branch, parent, child, leaf, edge, path, level in a file structure of a file system. Comparison module 215 may compare the hierarchical file structure of the file system in the new backup image to a hierarchical file structure of a file system in the backup image from the first deduplication group. If the file structures of the two backup images being compared satisfy a predetermined file structure threshold, then the new backup image may be placed in the same group as the matching backup image.

In some cases, metadata module 210 may obtain metadata from a data structure of a database management system in the backup image. Metadata module 210 may obtain information regarding a structure of a database management system in the backup image. Comparison module 215 may compare the metadata from the data structure of the database management system in the backup image with information from a data structure in the backup image from the first deduplication group. Upon finding a match, the new backup image may be placed in a group accordingly.

In one embodiment, content module 220 may obtain a portion of content within a file of the new backup image, the portion may include N bits of the content. The amount of content may be limited by a predetermined limiting factor. For example, the N bits may be limited to a certain percentage and/or a range of percentages such as 10% or less of the total content within the file. N bits may be limited by a set amount of bits such as 32 bits (4 bytes) or less. Comparison module 215 may compare the portion of content within the file with information from one or more nodes in the backup image from the first deduplication group. Upon finding a match, the new backup image may be placed in a group accordingly.

In some embodiments, upon failing to match the new backup image with one of the plurality of deduplication groups, group creation module 225 may create a new deduplication group. Accordingly, group creation module 225 may store the new backup image in the new deduplication group. In some cases, comparison module 215 may use locality-sensitive hashing (e.g., the MinHash algorithm) to perform comparisons and determine whether a match exists between the new backup image and one of the plurality of deduplication groups. Locality-sensitive hashing is a method of performing probabilistic dimension reduction of high-dimensional data. The input items may be hashed so that similar items are mapped to the same buckets with high probability. In some cases, the number of buckets may be smaller than the universe of possible input items. This is different from the conventional hash functions, such as those used in cryptography, as in this case the goal is to maximize the probability of "collision" of similar items rather than to avoid collisions.

Figure 3:
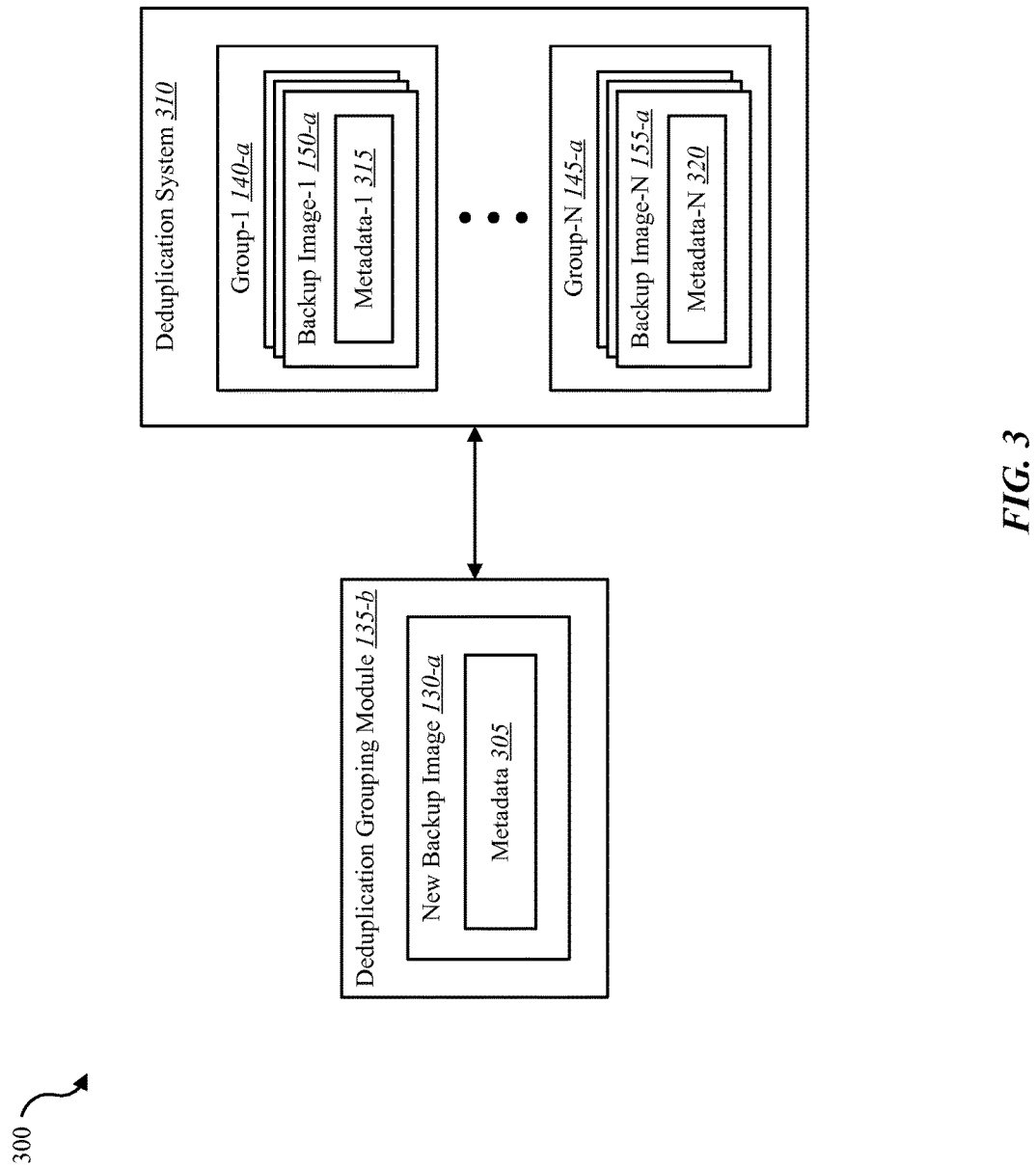
FIG. 3 is a block diagram illustrating one example of an environment for grouping backup images into deduplication groups.

FIG. 3 is a block diagram illustrating one example of an environment 300 for grouping backup images into deduplication groups. Environment 300 may include deduplication grouping module 135-b communicatively coupled to a deduplication system 310. Deduplication grouping module 135-b may be one example of deduplication grouping module 135 of FIG. 1.

As depicted, deduplication grouping module 135-b may process new backup image 130-a. New backup image 130-a may be one example of new backup image 130 of FIG. 1. New backup image 130-a may include metadata 305. Metadata 305 may include metadata of one or more files and/or one or more directories in new backup image 130-a. In some cases, metadata 305 may include metadata of a database in new backup image 130-a. In some cases, metadata 305 may include a hierarchical structure of a file system in new backup image 130-a.

As depicted, deduplication 310 may store backup images in one or more deduplication groups. For example, group-1 140-a may include one or more backup images (e.g., backup image-1 150-a), etc. Each backup image of each group may include metadata. For example, backup image-1 150-a may include metadata-1 315, and so forth. Metadata-1 315 may include metadata information from files, directories, databases, file structure, and/or file systems, etc., from backup image-1 150-a.

Deduplication grouping module 135-b may access metadata 305 and compare information from metadata 305 with metadata-1 315 from backup image-1 150-a of group-1 140-a. If deduplication grouping module 135-b determines a match exists between metadata 305 and metadata-1 315, then new backup image 130-a may be placed in group-1 140-a. If deduplication grouping module 135-b determines that no match exists for metadata 305, then deduplication grouping module 135-b may create a new group in which to place new backup image 130-a.

Figure 4:
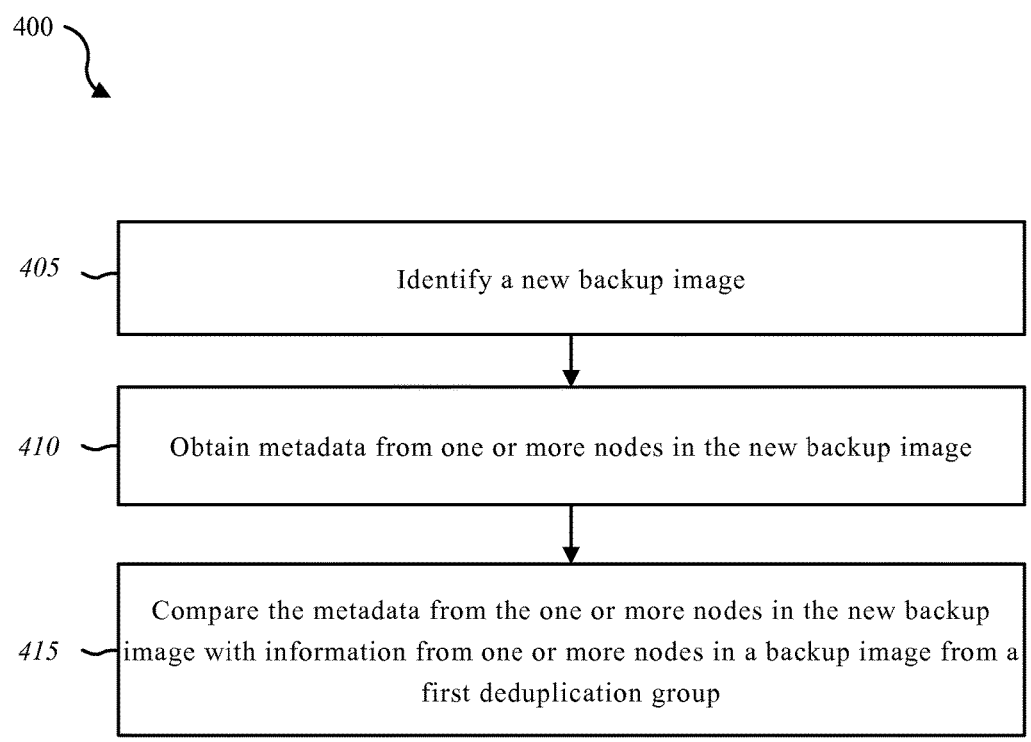
FIG. 4 is a flow diagram illustrating one embodiment of a method for deduplication grouping.

FIG. 4 is a flow diagram illustrating one embodiment of a method 400 for grouping backup images in deduplication groups. In some configurations, the method 400 may be implemented by the deduplication module 135 illustrated in FIGS. 1, 2, and/or 3.

At block 405, a new backup image may be identified. At block 410, metadata from one or more nodes in the new backup image may be obtained. Each of the one or more nodes may include a file or a directory. At block 415, the metadata from the one or more nodes in the new backup image may be compared with information from one or more nodes in a backup image from a first deduplication group. In some cases, the first deduplication group may be one group from a multiple deduplication groups.

Figure 5:
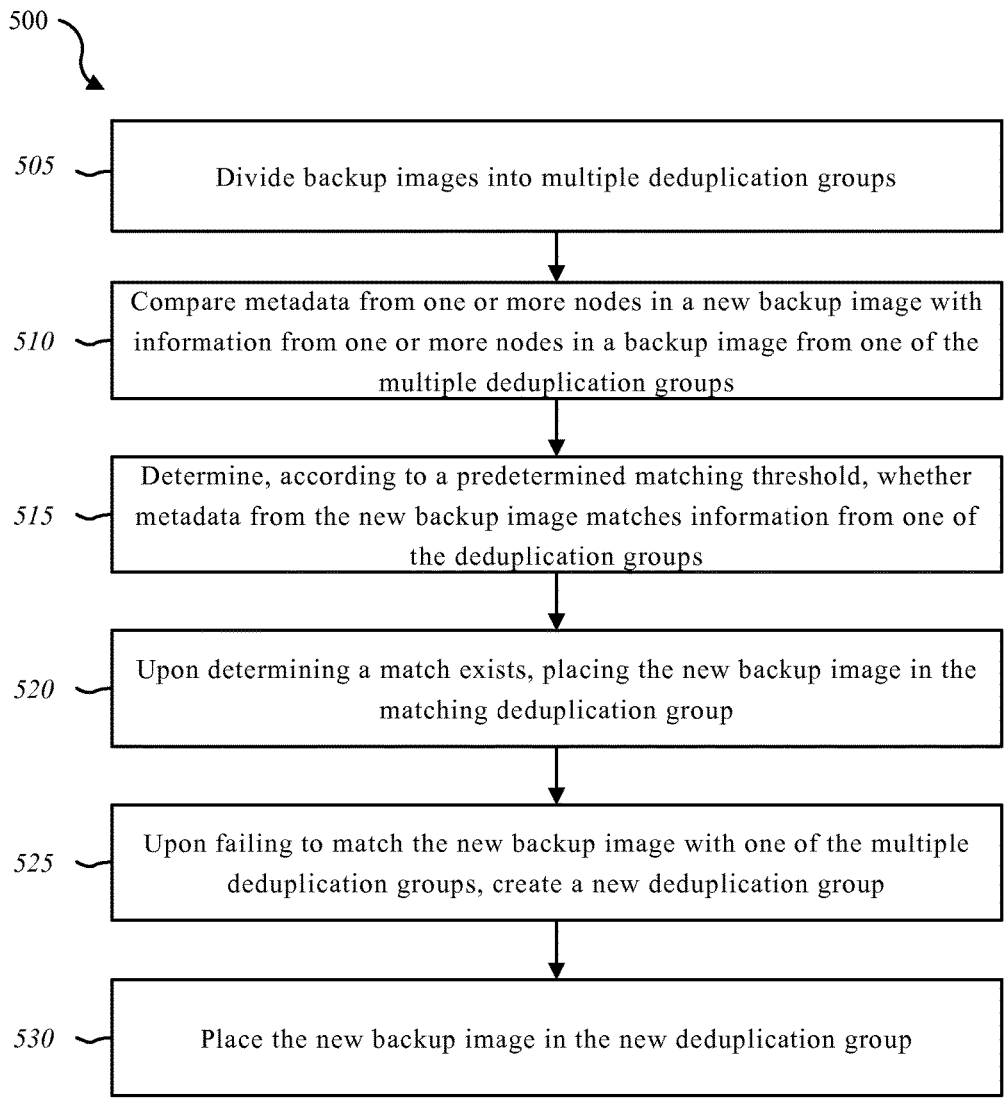
FIG. 5 is a flow diagram illustrating one embodiment of a method for deduplication grouping.

FIG. 5 is a flow diagram illustrating one embodiment of a method 500 for grouping backup images in deduplication groups. In some configurations, the method 500 may be implemented by the deduplication module 135 illustrated in FIGS. 1, 2, and/or 3.

At block 505, backup images may be divided into multiple deduplication groups. At block 510, metadata from the one or more nodes in the new backup image may be compared with information from one or more nodes in a backup image from a first deduplication group from the multiple deduplication groups. In some cases, locality-sensitive hashing may be used to determine whether a match exists between the new backup image and one of the multiple deduplication groups. At block 515, according to a predetermined matching threshold, it may be determined whether metadata from the new backup image matches information from one of the deduplication groups. The determination may be based on the comparing the metadata from the one or more nodes in the new backup image with information from a backup image of one of the multiple deduplication groups. At block 520, upon determining a match, the new backup image may be placed in the matching deduplication group. At block 525, upon failing to match the new backup image with one of the multiple deduplication groups, a new deduplication group may be created. At block 530, the new backup image may be placed in the new deduplication group.

Figure 6:
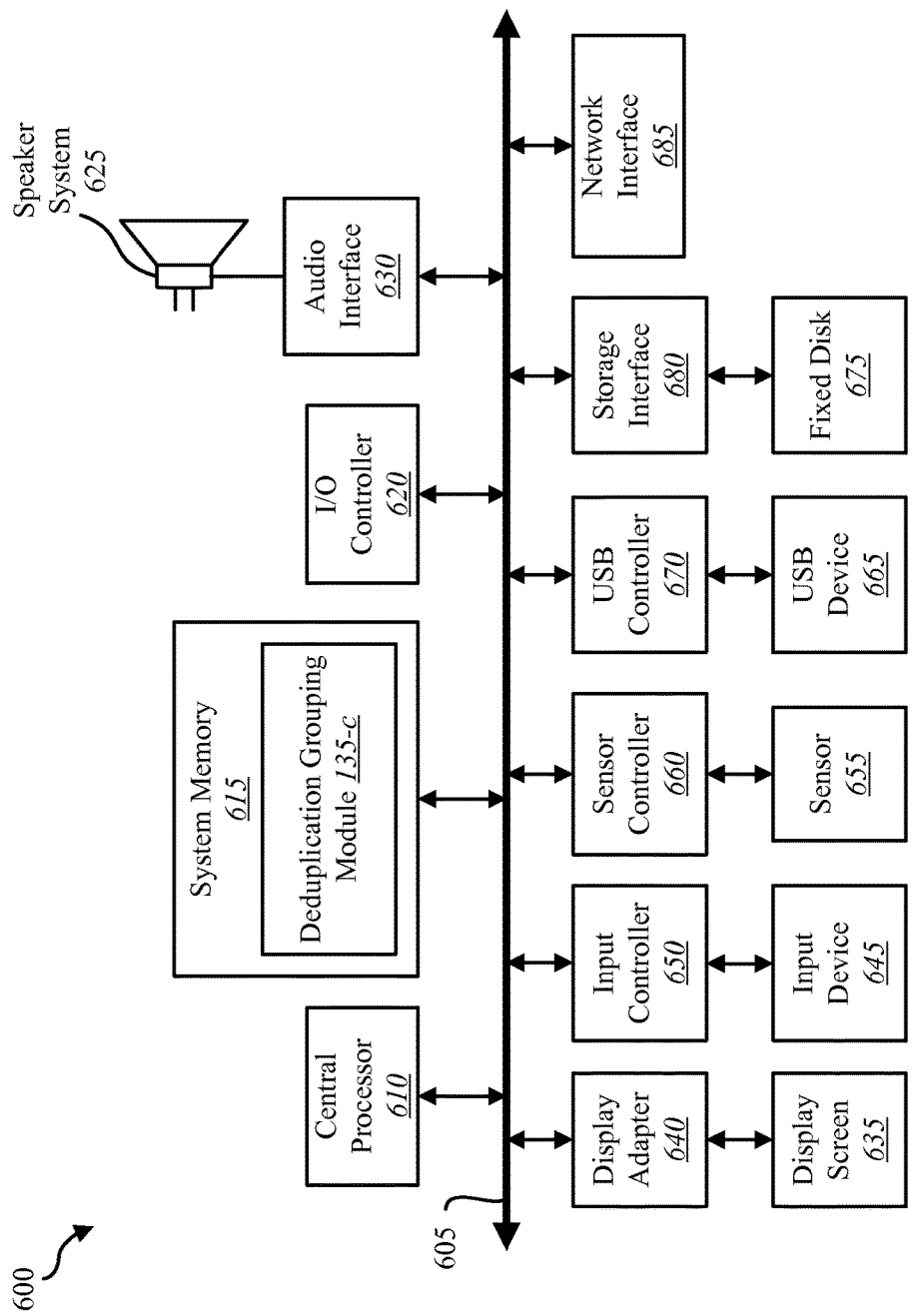
FIG. 6 depicts a block diagram of a computer system suitable for implementing the present systems and methods.

FIG. 6 depicts a block diagram of a computing device 600 suitable for implementing the present systems and methods. The controller 600 may be an example of device 105 and/or server 110 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the deduplication module 135-c to implement the present systems and methods may be stored within the system memory 615. Applications resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for deduplication grouping, comprising:
   identifying a new backup image;
   enumerating a top N levels of directories and files in the backup image;
   obtaining metadata of the top N levels of directories and files in the new backup image;
   applying a hash function to the metadata to generate one or more first hash values;
   obtaining one or more second hash values of metadata corresponding to a top N levels of directories and files of each of a first deduplication group and a second deduplication group, wherein the first deduplication group and the second deduplication group do not share hash values with one another;
   comparing the one or more first hash values to one or more second hash values that correspond to hashes of metadata of the first deduplication group and the second deduplication group;
   identifying which of the first deduplication group and the second deduplication group has hash values that match most of the one or more first hash values; and
   designating the first deduplication group as a deduplication group for the new backup image, responsive to identifying the first deduplication group as having more hash values that match more of the one or more first hash values than the second deduplication group.

2. The method of claim 1, further comprising:
   comparing a hierarchical file structure of the file system in the new backup image to a hierarchical file structure of a file system in the backup image from each of the first and second deduplication groups.

3. The method of claim 1, further comprising:
   obtaining metadata from a data structure of a database management system in the backup image.

4. The method of claim 3, further comprising:
   comparing the metadata from the data structure of the database management system in the backup image with information from a data structure in the backup image from each of the first and second deduplication groups.

5. The method of claim 1, wherein designating the first deduplication group is in further response to determining the given deduplication group meets a matching threshold level.

6. The method of claim 5, wherein in response to determining the given deduplication group does not meet the matching threshold level:
   creating a new deduplication group; and
   storing the new backup image in the new deduplication group.

7. The method of claim 1, further comprising:
   upon failing to match the new backup image with any of the two or more deduplication groups, creating a new deduplication group; and
   storing the new backup image in the new deduplication group.

8. The method of claim 1, wherein said hash function is a locality-sensitive hash function.

9. A computing device configured for deduplication grouping, comprising:
   a processor;
   memory in electronic communication with the processor, wherein the memory stores computer executable instructions that when executed by the processor cause the processor to perform the steps of:
   identifying a new backup image;
   enumerating a top N levels of directories and files in the backup image;
   obtaining metadata of the top N levels of directories and files in the new backup image;
   applying a hash function to the metadata to generate one or more first hash values;
   obtaining one or more second hash values of metadata corresponding to a top N levels of directories and files of each of a first deduplication group and a second deduplication group, wherein the first deduplication group and the second deduplication group do not share hash values with one another;
   comparing the one or more first hash values to one or more second hash values that correspond to hashes of metadata of the first deduplication group and the second deduplication group;

identifying which of the first deduplication group and the second deduplication group has hash values that match most of the one or more first hash values; and designating the first deduplication group as a deduplication group for the new backup image, responsive to identifying the first deduplication group as having more hash values that match more of the one or more first hash values than the second deduplication group.

10. The computing device of claim 9, wherein the instructions executed by the processor cause the processor to perform the steps of:

comparing a hierarchical file structure of the file system in the new backup image to a hierarchical file structure of a file system in the backup image from each of the first and second deduplication groups.

11. The computing device of claim 9, wherein the instructions executed by the processor cause the processor to perform the steps of:

obtaining metadata from a data structure of a database management system in the backup image.

12. The computing device of claim 11, wherein the instructions executed by the processor cause the processor to perform the steps of in response to determining the first deduplication group does not meet a matching threshold level:

create a new deduplication group; and store the new backup image in the new deduplication group.

13. The computing device of claim 9, wherein designating the first deduplication group is in further response to determining the given deduplication group meets a matching threshold level.

14. The computing device of claim 13, wherein in response to determining the first deduplication group does not meet the matching threshold level:

creating a new deduplication group; and storing the new backup image in the new deduplication group.

15. A non-transitory computer-readable storage medium storing computer executable instructions that when executed by a processor cause the processor to perform the steps of:

identifying a new backup image;

enumerating a top N levels of directories and files in the backup image;

obtaining metadata of the top N levels of directories and files in the new backup image;

applying a hash function to the metadata to generate one or more first hash values;

obtaining one or more second hash values of metadata corresponding to a top N levels of directories and files of each of a first deduplication group and a second deduplication group, wherein the first deduplication group and the second deduplication group do not share hash values with one another;

comparing the one or more first hash values to one or more second hash values that correspond to hashes of metadata of the first deduplication group and the second deduplication group;

identifying which of the first deduplication group and the second deduplication group has hash values that match most of the one or more first hash values; and designating the first deduplication group as a deduplication group for the new backup image, responsive to identifying the first deduplication group as having more hash values that match more of the one or more first hash values than the second deduplication group.

* * * * *